United States Patent [19]

Baskin

[11] 4,210,398
[45] Jul. 1, 1980

[54] PHOTOGRAPHIC PRINTING APPARATUS

[76] Inventor: William H. Baskin, 4634 RIvercliff Dr., Lilburn, Ga. 30247

[21] Appl. No.: 913,047

[22] Filed: Jun. 6, 1978

[51] Int. Cl.² ........................................... G03B 27/44
[52] U.S. Cl. .................................. 355/54; 355/74
[58] Field of Search .......................... 355/54, 53, 74; 354/123

[56] References Cited

U.S. PATENT DOCUMENTS

| | | | |
|---|---|---|---|
| 2,601,804 | 7/1952 | Nineberg | 355/53 |
| 3,667,364 | 6/1972 | Mann | 354/123 X |
| 3,728,021 | 4/1973 | Retzyl et al. | 355/74 |
| 3,801,198 | 4/1974 | David | 355/54 X |
| 3,837,742 | 9/1974 | Wally, Jr. | 355/53 X |
| 3,907,426 | 9/1975 | Goodliffe | 355/54 X |
| 3,998,546 | 12/1976 | Wally, Jr. et al. | 355/54 X |
| 4,154,525 | 5/1979 | Hess et al. | 355/74 |

Primary Examiner—Richard A. Wintercorn
Attorney, Agent, or Firm—Robert B. Kennedy

[57] ABSTRACT

Photographic printing apparatus for printing a montage of contiguous images comprising a baseboard above which an enlarger is positioned, a guide mounted atop the baseboard, an easel having an easel base upon which photographic printing paper may be supported and a mask defining an aperture mountable upon the base in a plurality of orientation, and a locator for locating the easel at a plurality of positions along the guide atop the baseboard. The easel also has a cam rotatably mounted beneath a base upper surface to which a leaf spring is secured over the cam, and a lift rod movably mounted between the cam and leaf spring.

A method of printing a montage of contiguous images on photosensitive paper comprising the steps of mounting a sheet of photosensitive paper upon an easel, mounting a mask defining an aperture upon the easel overlaying the sheet of paper, positioning the easel in the first position upon a baseboard over which an enlarger is mounted with the mask aperture bounding a spacial area at a fixed location with respect to the enlarger, projecting an image onto the photosensitive paper through the mask aperture, repositioning the easel at a second position upon the baseboard, relocating the mask aperture upon the easel and paper to bound the spacial area at said fixed location in respect to the enlarger, and projecting a second image onto the photosensitive paper through the mask aperture.

7 Claims, 9 Drawing Figures

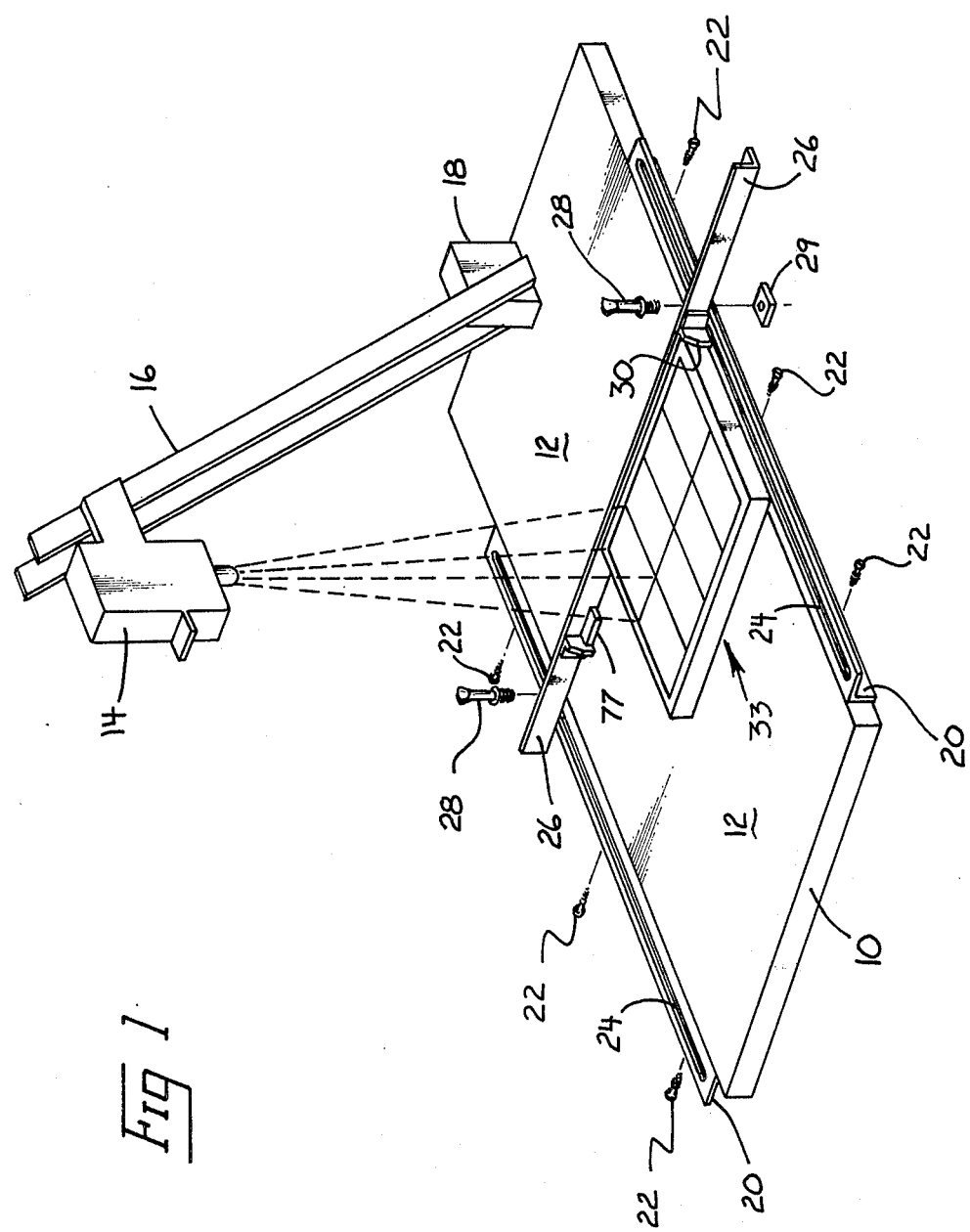

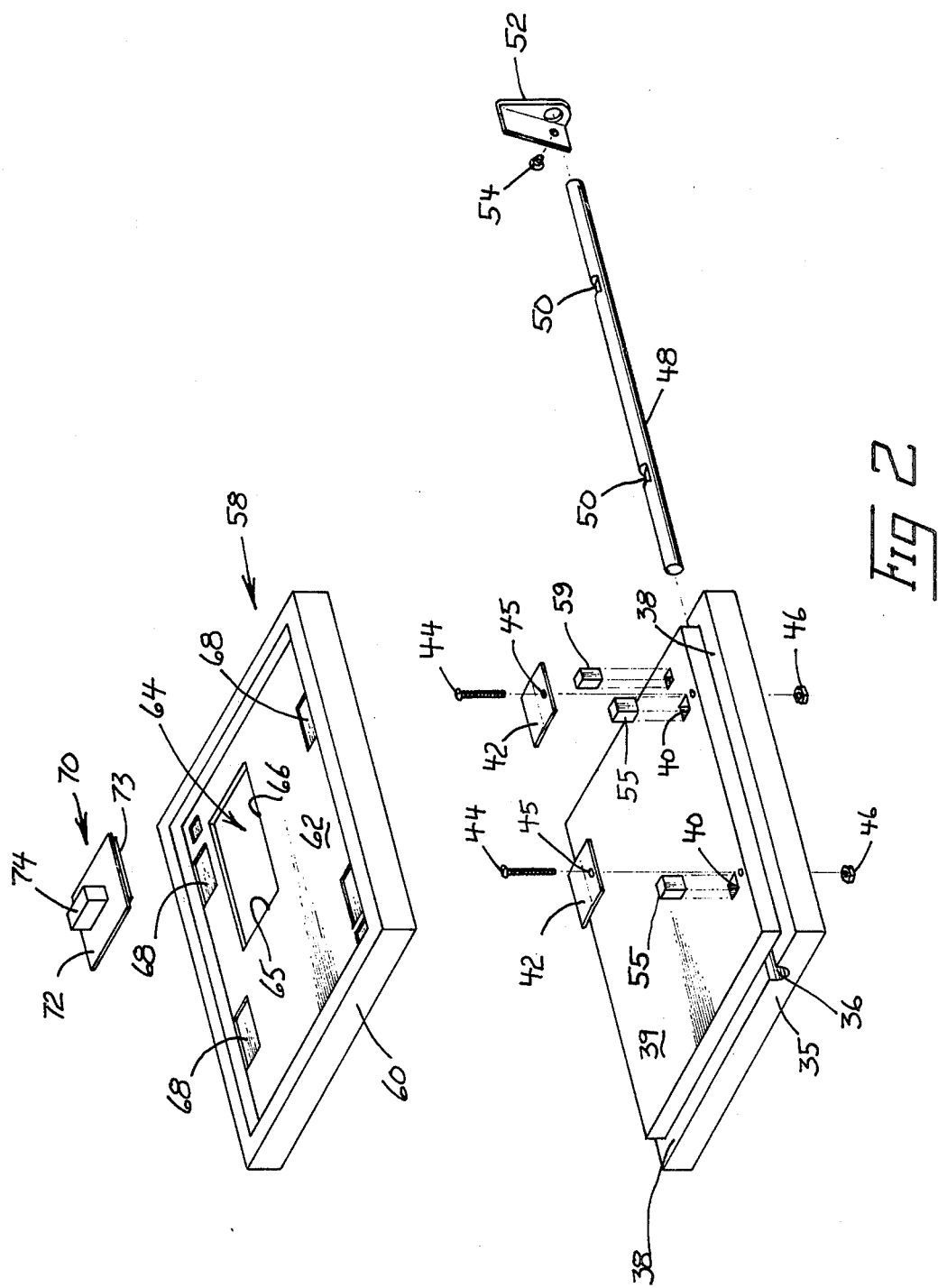

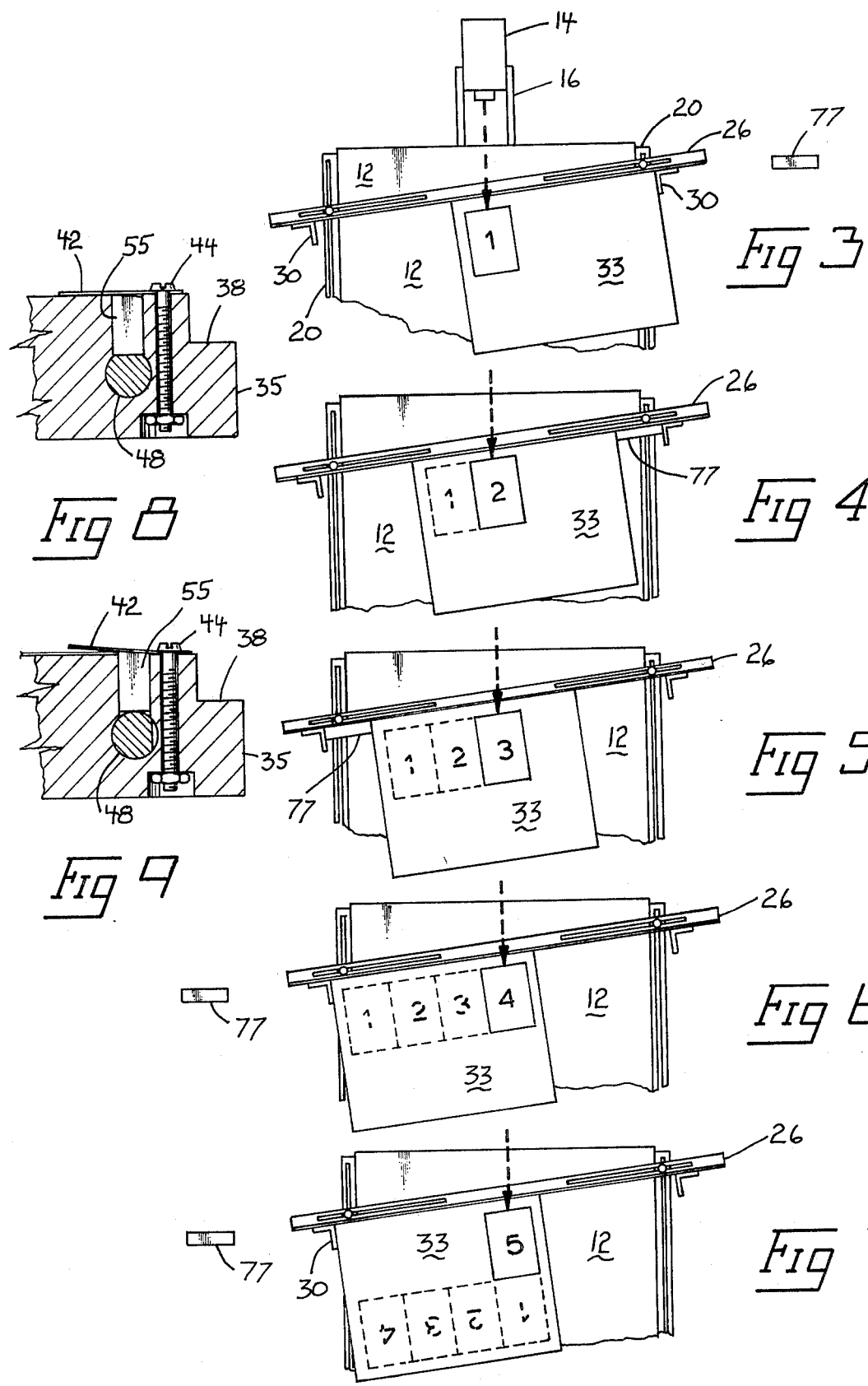

PHOTOGRAPHIC PRINTING APPARATUS

BACKGROUND OF THE INVENTION

This invention relates to apparatuses and method of printing a montage of images upon photosensitive paper.

Heretofore, numerous methods and devices have been made for forming a montage of images on photosensitive paper as exemplified in U.S. Pat. Nos. 3,944,364, 2,549,699, 2,496,701, 2,251,184, 2,238,049, United Kingdom Pat. Nos. 1,372,857 and 713,151 and French Pat. No. 985,768. These prior art apparatuses however have been plagued with numerous problems and deficiencies. For example, it has been quite difficult to provide a montage of contiguous images with them without creating image overlap or spacings. Trial and error is required all too frequently. In many cases it has been difficult to make a borderless montage without some border or image loss. The devices have been complex rendering it difficult to readily mount and properly align the paper to a supporting easel. Relocation of the easel, or the photosensitive paper thereon, to bring successive portions of the photographic paper upon which a montage is to be made into precise alignment with the enlarger has also been very difficult to accomplish.

Today, the need for a device for printing such montages is quite substantial, particularly in the field of making color prints of relatively small sizes. This is due to the fact that color photosensitive paper is ordinarily manufactured and sold in only fairly large sheet sizes. As a result there is often much waste particularly by amateurs of the photosensitive paper when making prints of small sizes. Such is, of course, quite costly.

Accordingly, it is a general object of the present invention to provide improved apparatuses and methods for printing a montage of images on photosensitive paper.

More specifically, it is an object of the invention to provide printing apparatuses and methods for printing a montage of contiguous images on a sheet of photosensitive paper with enhanced image registry and without image overlap or spacings.

Another object of the invention is to provide a method of printing a montage of images on photosensitive paper with enhanced ease, speed and accuracy of repositioning the paper beneath an enlarger.

Another object of the invention is to provide photographic printing apparatus of the type described of relatively simple and economic construction and which may be utilized with facility and with a minimum of training.

Yet another object of the invention is to provide a photographic easel with improved means for mounting and aligning a sheet of photosensitive paper thereon.

SUMMARY OF THE INVENTION

In one form of the invention photographic printing apparatus is provided for printing a montage of images. The apparatus comprises a baseboard above which an enlarger is positioned, a guide mounted atop the baseboard, upon an easel having an easel base upon which photographic printing paper may be supported and a mask defining an aperture mountable upon the base in a plurality of orientation, and means for locating the easel in a plurality of positions along the guide atop the baseboard.

In another form of the invention a method is provided for printing a montage of images on photosensitive paper which comprises the steps of mounting a sheet of photosensitive paper on an easel, mounting a mask defining an aperture upon the easel overlaying the sheet of paper, positioning the easel at a first position upon a baseboard over which an enlarger is mounted with the mask aperture bounding a spacial area at a fixed location with respect to the enlarger, and projecting an image onto the photosensitive paper through the mask aperture. The easel is then repositioned at a second position upon the baseboard, the mask aperture relocated upon the easel and photosensitive paper to bound the spacial area at the fixed location with respect to the enlarger, and a second image projected onto the photosensitive paper through the mask aperture.

In yet another form of the invention a photographic printing easel is provided having a base with an upper surface upon which a sheet of photosensitive paper may be supported, a cam rotatably mounted to the base beneath the upper surface, a leaf spring secured atop the base upper surface over the cam, and a lift rod movably mounted between the cam and leaf spring. So constructed the cam may in one position force the lift rod to a raised position urging a portion of leaf spring off the surface of the base to enable an edge of photosensitive paper to be positioned against the leaf rod beneath the leaf spring, and the cam may in another position lower the lift rod to enable the leaf spring to hold the sheet of paper firmly in place against the lift rod and base upper surface.

BRIEF DESCRIPTION OF THE DRAWING

FIG. 1 is a perspective view of photographic printing apparatus embodying principles of the invention which apparatus may be used in practicing a method of the invention.

FIG. 2 is an exploded view, in perspective, of the easel components of the printing apparatus shown in FIG. 1.

FIGS. 3–7 are sequential plan views showing a series of easel orientations in printing a montage of contiguous images utilizing the apparatus shown in FIG. 1.

FIG. 8 is a sectional view of the paper gripper component of the easel shown in FIG. 2 shown in a gripping position.

FIG. 9 is a sectional view of the easel paper gripper shown in an ungripping position receiving a sheet of paper.

DESCRIPTION OF THE PREFERRED EMBODIMENTS

Referring now in more detail to the drawing, there is shown in FIG. 1 photographic printing apparatus which comprises a baseboard 10 having a flat upper surface 12. A conventional photographic enlarger 14 is adjustably mounted to a shaft 16 that extends upon an incline upward from a mount 18 secured atop the baseboard. A pair of horizontal tracks 20 are mounted by screws 22 to opposed sides of the baseboard so as to straddle it. These tracks are provided by angle irons having an elongated slot 24 formed in the upper surface thereof coplanar the baseboard upper surface. Another angle iron provides a guide 26 which traverses the upper baseboard surface 12 and the two baseboard straddling tracks 20. This traversing guide also has an elongated slot in its horizontal surface whereby it may be secured firmly to the baseboard tracks by a pair of threaded pins 28 passing through both slots and by nuts 29 in numerous positions and orientations atop the baseboard. A pair of stops 30 is rigidly secured to an upright surface of the guide 26.

With reference next to FIG. 2 an easel 33 is shown for use with the printing apparatus shown in FIG. 1 atop the baseboard upper surface 12. The easel is seen to include a rectangular base 35 having a cylindrical channel 36 extending horizontally therethrough beneath an upper flat easel surface 39. The sides of the base are formed with a step having a ledge 38. The base is also provided with two mutually spaced, vertically oriented auxiliary channels 40 that extend from cylindrical channel 36 to the upper base surface 39. With reference also to FIGS. 8 and 9 a pair of leaf springs 42 is seen to be mounted flush to the top surface 39 with a movable portion overlaying the orifice of channels 40 at the upper surface 39. Mounting is done by a pair of screws 44 which extend through holes 45 in the leaf spring and by nuts 46. A cylindrical cam bar 48 is rotatably mounted within the cylindrical channel 36 with camming surfaces 50 positioned at the juncture of channels 36 and 40. The handle 52 is secured to one end of the cam bar by screw 54. A pair of lift bars 55 is positioned within channels 40 with the upper surface in movable abutment with the movably portion of leaf springs 42 and with the lower surface in abutment with camming surfaces 50 of the cam bar 48. A side paper positioning stop 59, which may be formed integrally with the easel surface, projects above surface 39.

With continued reference to FIG. 2 the easel itself is seen further to include a mask 58 having a rectangular rim 60 sized to be snuggly mounted atop the peripheral ledge 38 of the easel base. This rim extends from a recessed planar center section 62 of the mask whereby it may be readily mounted to the easel base in either an upright or inverted position. The mask center section 62 defines a rectangular aperture 64 in one quadrant with contiguous aperture defining side edges 65 and 66 laying along bisecting planes of the mask. The center section 62 is also formed with depressions 68 to receive the leaf springs 42 in a plurality of masks positions relative to the base thereby enabling the mask center section 62 to lay flush upon the base surface 39. The easel also includes a shutter 70 having a rectangular center section 72 from which a lower section 73 of reduced size projects. The shutter is also provided with a handle 74 extending from its upper surface. The shutter is sized to be mounted upon either principal side of the mask center section 62 with the lower section 73 resting snuggly within the bounds of the aperture 64. In this position the shutter is sized to close exactly half the area of the aperture 64 when slid to either one or two opposed positions over the aperture.

In operation a sheet of photosensitive paper may be readily mounted and secured to the easel by rotating handle 52 to a position where the cam bar 48 urges the lift rods 55 to a raised position as shown in FIG. 9 whereupon they protrude above the surface 39 of the easel base pushing the movable portion of the leaf springs 42 distal their securing screws 44 slightly off of the easel upper surface. The photosensitive paper is then slid under the raised lips of the leaf springs into abutment with the lift rods which thus serve as paper positioning stops and with the positioning stop 59. Handle 52 is then rotated whereupon the camming surfaces 50 enable the lift rods 52 to descend beneath the upper easel surface 39 under the force of the resilient leaf springs. As this is done the springs are brought into flush engagement with the photosensitive paper which is then sandwiched tightly in position between the leaf springs and upper easel surface and in positioning abutment with the lift rods. The mask 58 is then mounted atop the easel base and shutter 70 placed within the aperture 64 if images are to be made of sizes half that of the aperture.

With reference next to FIGS. 3–7 an operative sequence of events in forming a montage of eight contiguous images upon a single sheet of photosensitive paper is illustrated. The assembled easel 33, here shown in outline form only, is placed in flush abutment with the traversing guide 26 with one of the fixed stops 30. An image 1 from the enlarger 14 is then projected within that half portion of aperture 64 uncovered by shutter 70. Precise prealignment of the image within this rectangular space is made possible by the fact that the guide 26 may be readily adjusted upon the tracks 20.

Next, a spacer 77 in the form of a bar of length equaling the width of image 1, is inserted between one side edge of the easel base and stop 30 and the shutter 70 slid to its opposite side of the aperture. This positions the other half of the aperture so as to present the same spacial area defined in the open aperture beneath the enlarger 14. Image 2 is then formed with one border contiguous with that of image 1 as shown in FIG. 4. Following this the spacer 77 is moved into abutment with the opposite fixed stop 30 upon the guide 26 and the mask inverted and shutter repositioned whereby the open space of aperture 64 is exactly aligned for the making of image 3 contiguous that of image 2 as shown in FIG. 5. Next, as shown in FIG. 6, the spacer 77 is removed and the easel placed in abutment with this other stop 30 and shutter 70 relocated whereby an image 4 is formed contiguous to image 3. Following this, as shown in FIG. 7 the entire easel is rotated 180° and the mask inverted to present a fifth open area at the same location from projector 14 to form an image 5. The remaining images may now be made as previously described and the easel mask removed from the base the cam bar is rotated by handle 52 to release the photosensitive paper which may be then easily removed from the easel for developing.

If desired, spot corrections may also be made to each of like images in the montage with the first described apparatus and method. In such case a correcting mask is merely mounted in a frame sized to fit in the aperture 64 and sequentially stepped over the printing medium during the making of the montage.

It should be understood that the just described embodiments merely illustrate principles of the invention in selected, preferred forms. Many modifications, additions and deletions may, of course, be made thereto without departure from the spirit and scope of the invention as set forth in the following claims.

I claim:

1. Photographic printing apparatus for printing a montage of images and comprising, in combination, a baseboard above which an enlarger may be positioned; a guide mounted atop said baseboard; an easel having an easel base upon which photographic printing paper may be supported, (and) a mask defining an aperture, and means for mounting said mask (mountable) upon said base in a plurality of orientations; and means for locating said easel at a plurality of positions along said guide atop said baseboard.

2. Photographic printing apparatus in accordance with claim 1 further comprising means for mounting said guide at a plurality of positions and orientations atop said baseboard.

3. Photographic printing apparatus in accordance with claim 2 wherein said guide mounting means comprises a pair of tracks straddling said baseboard and means for securing said guide to said tracks.

4. Photographic printing apparatus in accordance with claim 3 wherein said easel locating means comprising a pair of stops mounted to said guide adjacent said pair of tracks, and a spacer positioned atop said baseboard between one of said stops and said easel base.

5. Photographic printing apparatus in accordance with claim 1 wherein said easel mask is rectangular and wherein said easel mask aperture is rectangular and defined within one quadrant of said mask.

6. Photographic printing apparatus in accordance with claim 5 wherein two contiguous aperture defining mask borders are located along bisecting planes of said rectangular mask.

7. Photographic printing apparatus in accordance with claim 6 further comprising a shutter mountable to said mask to overlay alternate portions of said mask aperture.

* * * * *